(12) United States Patent
Jiang et al.

(10) Patent No.: US 8,354,940 B2
(45) Date of Patent: Jan. 15, 2013

(54) AUTOMATED REMOTE WATER QUALITY MONITORING SYSTEM WITH WIRELESS COMMUNICATION CAPABILITIES AND THE METHOD THEREOF

(75) Inventors: Joe-Air Jiang, Taipei (TW); Jyh-Cherng Shieh, Taipei (TW); En-Cheng Yang, Taipei (TW); Fu-Ming Lu, Taipei (TW); Kuo-Chi Liao, Taipei (TW); Chih-Hung Hung, Taipei (TW); Tzu-Yun Lai, Taipei (TW); Jiing-Yi Wang, Taipei (TW); Chang-Wang Liu, Taipei (TW); Tzu-Shiang Lin, Taipei (TW); Chia-Pang Chen, Taipei (TW); Yi-Jing Chu, Taipei (TW)

(73) Assignee: National Taiwan University, Taipei (TW)

( * ) Notice: Subject to any disclaimer, the term of this patent is extended or adjusted under 35 U.S.C. 154(b) by 371 days.

(21) Appl. No.: 12/757,207

(22) Filed: Apr. 9, 2010

(65) Prior Publication Data
US 2011/0115640 A1    May 19, 2011

(30) Foreign Application Priority Data

Nov. 19, 2009  (TW) .............................. 98139408 A

(51) Int. Cl.
*G08C 19/16* (2006.01)
(52) U.S. Cl. .............................. 340/870.01; 340/870.07
(58) Field of Classification Search ............. 340/870.01, 340/870.07, 540, 539.1, 603, 573.6; 702/23, 702/55, 184, 188, 25, 122; 290/50, 54
See application file for complete search history.

(56) References Cited

U.S. PATENT DOCUMENTS
2009/0058088 A1* 3/2009 Pitchford et al. ............... 290/50
* cited by examiner

*Primary Examiner* — Joseph Lauture
(74) *Attorney, Agent, or Firm* — Allen, Dyer, Doppelt, Milbrath & Gilchrist, P.A.

(57) ABSTRACT

An automated remote water quality monitoring system with wireless communication capability and the method thereof is provided. A water quality monitoring system is provided, including: a plurality of monitoring apparatuses, each of which has a radio communication module transmitting at least one environmental parameter; a server receiving the at least one environmental parameter via a base station; and a gateway being one selected from a group consisting of the plurality of monitoring apparatuses, being geographically the closest one to the base station, receiving the at least one environmental parameter and transmitting the at least one environmental parameter to the base station.

18 Claims, 4 Drawing Sheets

AUTOMATED REMOTE WATER QUALITY MONITORING SYSTEM WITH WIRELESS COMMUNICATION CAPABILITIES AND THE METHOD THEREOF

FIELD OF THE INVENTION

This present invention relates to the field of remote water quality monitoring, particularly to a kind of automated remote water quality monitoring system with wireless communication capabilities.

BACKGROUND OF THE INVENTION

Due to the rapid development of human society and the impact of global climate change, the natural environment is seriously destructed day by day. In order to sustain the environmental management, the environment monitoring becomes more and more important.

Water is one of the essential life-sustaining elements for creatures. How to sustain the use of the limited water resource for a long period has become a highlighted issue nowadays. The water resource significantly affects human life. Building a reservoir to increase the water storage capacity has become a popular scheme for reserving water. Since the water quality of the basin and the water sources will directly affect the quality of the whole reservoir, the water quality monitoring for these areas apparently becomes very important. However, these areas are usually located in suburban areas where might not be easily accessed.

Traditionally, with regard to the basin and water sources in the suburban areas, the researchers always have to collect samples manually and bring them back to the laboratory to perform further analysis. Thus, the traditional way not only wastes time and human power resource, but also takes a long time to get the demanded data, and also has excessive long sampling intervals between each collection. Furthermore, the effects of real-time monitoring fail to be reached while not knowing that the environment has already been changed. That a serious pollution incident cannot be immediately dealt will cause a considerable damage soon after.

The unmanned water quality monitoring systems provided in the current market usually transmit data by using SMS or GPRS service built in the GSM phone module only and can not be used in the suburban areas where none of wireless communication signals is capable of reaching. Thus, the suburban areas have a defect for the water quality monitoring.

In view of the drawback of the conventional technique, the applicant tries to build a system for monitoring water quality in the remote basin where the typical GSM mobile communication signals can not reach. In this respect, the researchers can instantly get the monitored data without going to those remote areas. Consequently, the applicant uses an automated remote water quality monitoring system with wireless communication capability and the method thereof to overcome the above-mentioned shortcomings of conventional means.

SUMMARY OF THE INVENTION

The purpose of the present invention is to provide automated remote water quality monitoring apparatuses with wireless communication capabilities, configured in the vicinity of the remote basin to form "Network Topology", collecting the various environmental parameters from the remote basin, which are transmitted to a gateway through a radio communication module via a transmitting/receiving method of wireless communication, and transmitting the collected data as the text message format to a local server through a GSM phone module. Therefore, the purpose of the real-time automated environmental monitoring can be achieved.

In accordance with one aspect of the present invention, a water quality monitoring system is provided, including: a plurality of monitoring apparatuses, each of which has a radio communication module transmitting at least one environmental parameter; a server receiving the at least one environmental parameter via a base station; and a gateway being one selected from a group consisting of the plurality of monitoring apparatuses, being geographically the closest one to the base station, receiving the at least one environmental parameter and transmitting the at least one environmental parameter to the base station.

Preferably, the water quality monitoring system further includes: a database connected to the server to store and deal with the at least one environmental parameter according to a format of the database.

Preferably, each of the plurality of monitoring apparatuses further includes: at least one sensor measuring the at least one environmental parameter; and a micro-controller receiving the at least one environmental parameter from the at least one sensor.

Preferably, each of the plurality of monitoring apparatuses further includes a GPS module for positioning, the at least one sensor includes a water quality sensor and a temperature and humidity sensor, the at least one environmental parameter includes a ph value, a conductivity, a salinity, a water quality, a temperature, a humidity and a combination thereof, and the micro-controller further includes a serial port switching circuit.

Preferably, each of the plurality of monitoring apparatuses further includes a wireless communication module transmitting a message to the server via the base station, wherein the message is derived from the at least one environmental parameter.

Preferably, wherein the wireless communication module is a GSM phone module.

Preferably, each of the plurality of monitoring apparatuses further includes: a solar charging device providing a first power; and a power supply circuit connected to one of the solar charging device and an external power supply providing a second power.

Preferably, the at least one environmental parameter is transmitted/received via a radio signal and each of the plurality of monitoring apparatuses has a best route to communicate with one another and further includes a display screen providing an on-site monitoring.

In accordance with another aspect of the present invention, a water monitoring method for a monitoring system having a node and a plurality of monitoring apparatuses is provided, the method including the steps of: (A) using at least one of the plurality of monitoring apparatuses to detect at least one environmental parameter; (B) selecting a specific one being the closest one to the node from the plurality of monitoring apparatus to communicate with the node; (C) transmitting the at least one environmental parameter to the specific one; and (D) transmitting the at least one environmental parameter via the node.

Preferably, the step (A) further includes the steps of: (A1) initializing the plurality of apparatuses; and (A2) sending a data request command to the at least one of the plurality of monitoring apparatuses for requesting the at least one environmental parameter.

Preferably, the method further includes a step of returning to step (A1) if a detection of the at least one environmental parameter is abnormal.

Preferably, the method further includes a step of broadcasting an installing signal to establish the communication between the specific one and the at least one of the plurality of monitoring apparatuses.

Preferably, the step (C) further includes the steps of: (C1) transmitting the at least one environmental parameter to the specific one via a micro-controller and a radio communication module of the at least one of the plurality of monitoring apparatuses; and (C2) using the specific one to compile the at least one environmental parameter transmitted from the radio communication module.

Preferably, the node is a base station and the step (D) further includes a step (D1) of transmitting the at least one environmental parameter to a server by a message generated [Tom a wireless communication module of the specific one.

In accordance with another aspect of the present invention, a monitoring system including a plurality of water quality monitoring apparatuses communicating with a node is provided, the method including: a first water quality monitoring apparatus configured to be the geographically closest one to the node for communicating with the node; and at least one second water quality monitoring apparatus configured to communicate with the first water quality monitoring apparatus.

Preferably, each of the water quality monitoring apparatuses includes: at least one sensor measuring at least one environmental parameter; a micro-controller receiving the at least one environmental parameter from the at least one sensor; and a radio communication module configured to transmit the at least one environmental parameter of the micro-controller.

Preferably, each of the water quality monitoring apparatuses further includes: a GPS module positioning the at least one monitoring apparatus; a wireless communication module transmitting a message transferred from the at least one environmental parameter via the node; a solar charging device storing power for the apparatus; a power supply circuit connected to one of the solar charging device and a power supply providing a second power; and a display screen providing an on-site monitoring.

Preferably, the at least one sensor further includes a water quality sensor and a temperature and humidity sensor, the wireless communication module is a GSM phone module and the node is a base station.

Preferably, the micro-controller further includes a serial port switching circuit coupled to the at least one sensor and the radio communication module, and the micro-controller controls the at least one sensor and the radio communication module via the serial port switching circuit.

Preferably, the at least one environmental parameter is one selected from a group consisting of a pH value, a conductivity, a salinity, a water quality, a temperature, a humidity and a combination thereof.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
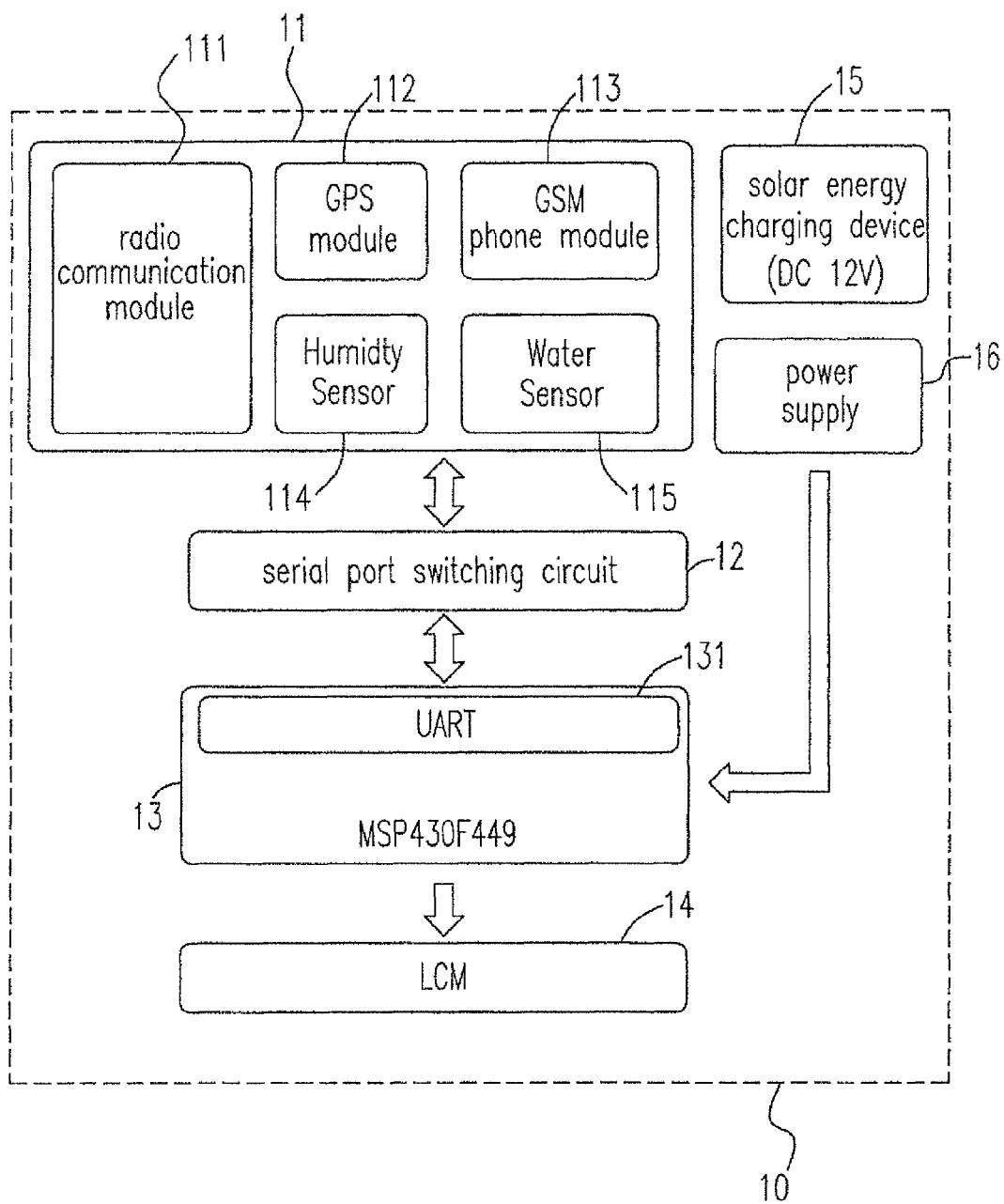
FIG. 1 is a schematic diagram showing an embodiment for building an automated water quality monitoring apparatus according to the present invention.

Please refer to FIG. 1, which is a schematic diagram showing an embodiment for building an automated water quality monitoring apparatus according to the present invention. The detecting device 10 includes a microcontroller 13, the core control chip MSP430-F449 developed by Texas Instruments Company, which transmits data and communicates with the external module unit 11 through Universal Asynchronous Receiver Transmitter (UART) 131 and a serial port switch circuit 12 (also known as serial communication port). Because there are numerous numbers of modules able to be connected, the serial communication port 12 can be used as a switching circuit to switch the serial port channel of the MSP430 chip, and the sensor data of all modules can be read in turn by the micro-controller 13. In this embodiment, the micro-controller 13 connects to a GPS (global positioning system) module 112, a GSM phone module 113, a temperature and humidity sensor 114, a water quality sensor 115 and a radio communication module 111, wherein the water quality sensor 115 used in this case is a water quality sensor developed by the company Eureka (Manta). The water quality sensor 115 can sense many parameters including a water temperature, a pH, a conductivity, a salinity and the combinations thereof and transmit an order of requested data through RS232. The device of the present invention used for sensing the water quality or environmental parameters includes the temperature and humidity sensor 114 and water quality sensor 115 and other sensing devices which can be applied to the detecting device 10 of the present invention. The power used in each module of the detecting device 10 has several different level voltages generated by the power supply circuit 16, so as to facilitate the use of each sensing module. The power supply circuit 16 takes the energy provided by the solar energy charging device 15, so as to facilitate the general operation on a cloudy day or at night as the normal operation on usual days. The design of the solar energy charging device 15 can also remit monitoring personnel labor for frequently renewing the battery. In order to operate the monitor device in the remote areas and/or the environment of a variety of bad days, the radio communication module 111 is used to develop a long distance wireless sensor network systems. The detection device 10 is also equipped with a liquid crystal display screen 14, which can provide researchers with a direct view of the measured data in the monitoring field, and facilitate the researchers to proceed with device debugging and maintenance testing.

Figure 2:
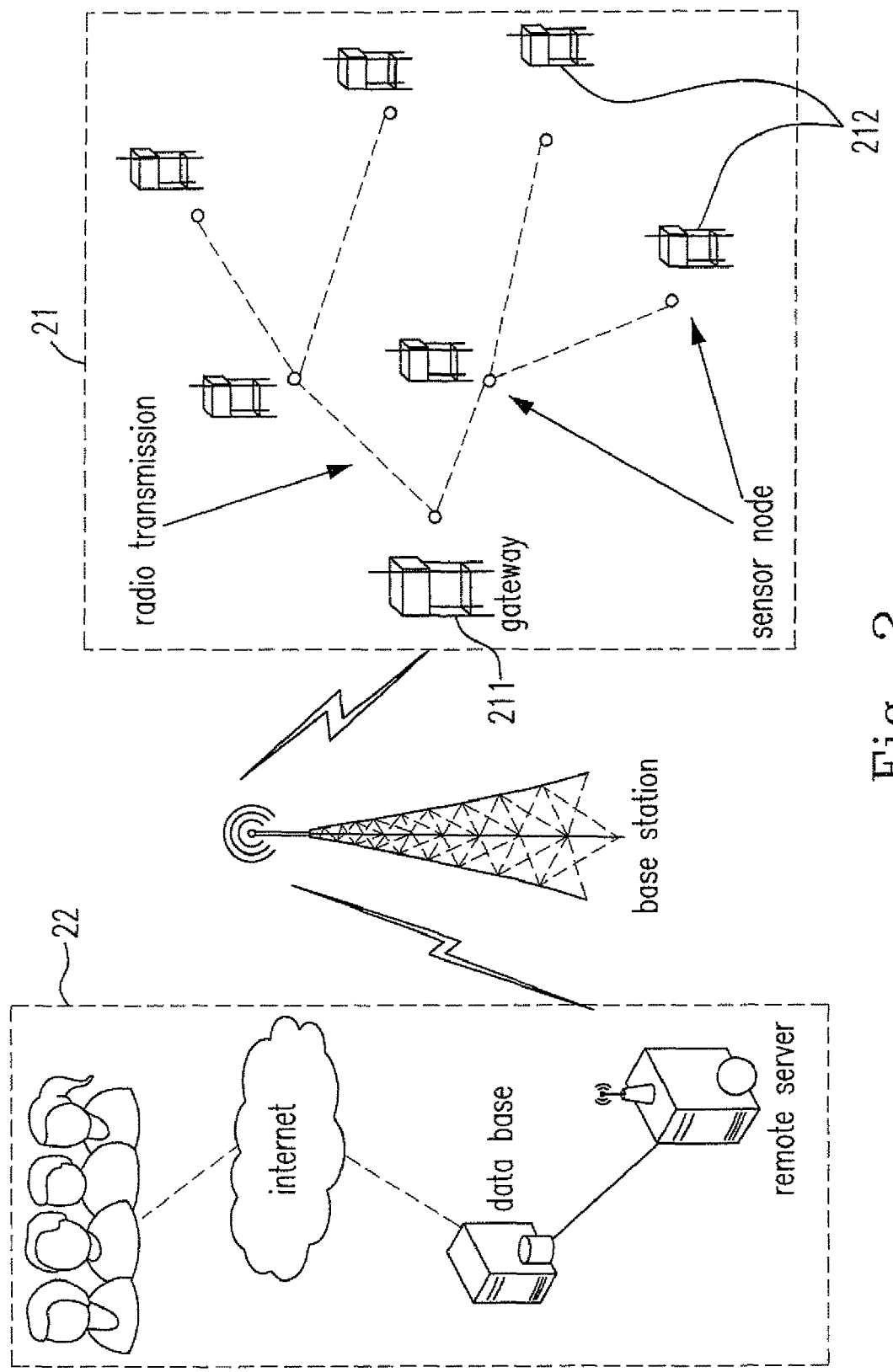
FIG. 2 is a schematic diagram showing an architecture for an automated water quality monitoring system according to the present invention.

Please refer to FIG. 2, which is a schematic diagram showing architecture for an automated water quality monitoring system according to the present invention. The distribution network 21 of the remote monitoring devices is disposed in the vicinity of the remote basin. The radio antenna module adopted in the embodiment is equipped with an omni-directional antenna to increase the transmitting power and range.

As shown in FIG. 2, the distance between two monitoring devices 212 (also known as sensor nodes) will be up to several kilometers, which is appropriate for water quality monitoring in the remote areas.

In FIG. 2, the Gateway 211 which is the closest to the base station and can receive the radio signals therefrom is the one of the sensing nodes 212. Every sensing node 212 is equipped with the radio communication module 212. Beside, the gateway 211 is further equipped with the wireless communication module for long distance, so as to return the collected data to the end of the server of the local device distribution structure 22.

Every sensing node 212 returns all requested data to the gateway 211 via the radio communication module. If the sensing node can not directly connect to the gateway 211, the sensing node will transfer the requested data to other sensing node which can connect to the gateway. Therefore, a network topology is formed. This would expand the sensing region and reach more dangerous sensing areas.

Accordingly, since the factors in the field are more unpredictable, the best return path won't always maintain the same. In order to ensure the success rate of data return, the best routing method will be re-established at each time so as to carry out the data return action. For example, while each sensing node 212 collects data, the gateway 211 will first transmit the establishing broadcast message. The sensing node 212 which receives the message from the gateway 211 will return a confirmation message back and be set as the first layer node. The first layer node will continually transmit the establishing broadcast message to other nodes after the first layer node connects to the gateway 211. The nodes which receive the message from the first layer node will return a confirmation message back and be set as the second layer nodes. The nodes which receive the message from the same or later layer node will ignore the message.

The later layer nodes may receive the broadcast message from more than one earlier layer nodes at the same time, and the later layer nodes will choose the strongest signal of the earlier layer node to establish a connection therebetween. Therefore, the broadcast message will continually be passed to the next layer nodes until the connections among all nodes are established. The requested data will be returned to the gateway according to the established path. After the gateway 211 has collected all the valid sensing data in the sensing network, all the data will be written into a short message, which will be returned to the back-end server via a long-range wireless communication module.

Figure 3:
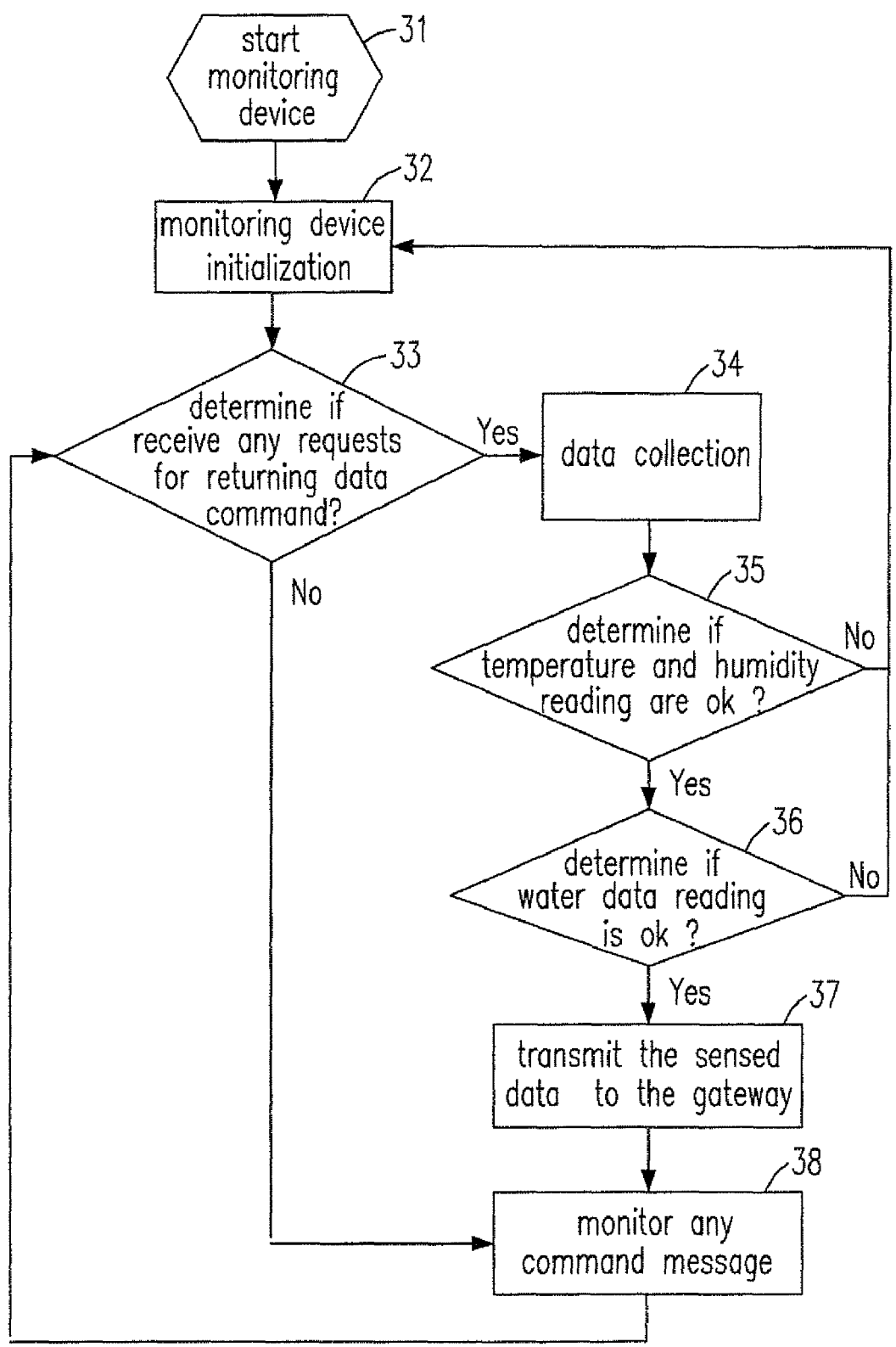
FIG. 3 is a flow chart showing an embodiment for an automated water quality monitoring apparatus according to the present invention.

Please refer to FIG. 3, which is a flow chart showing an automated water quality monitoring apparatus of an embodiment according to the present invention. First of all, the process begins at step 31 where the monitoring device is started. Then, the process proceeds to step 32 where the monitoring device initialization is implemented so that the monitoring device returns to an initial state. The process then proceeds to step 33 where a determination is made as to whether the monitoring device receives any requests for returning data command or not, so that the monitoring device can be operated in a ready condition. If not, the process then proceeds directly to step 38 for monitoring any command message. Once the monitoring device receives any requests for returning data command, the process then proceeds to step 34 where a data collection procedure is implemented. The process then proceeds to step 35 where a determination is made as to whether the temperature and humidity reading is normal or not. If not, the process then returns to step 32 and the monitoring device restarts its initialization again. Once the temperature and humidity reading is normal, the process then proceeds to step 36 where a determination is made as to whether the water data reading is normal or not. If not, the process then returns to step 32 and the monitoring device restarts its initialization again. Once the water data reading is normal, the process then proceeds to step 37 where the requested data is returned to the gateway and to step 38 where a determination is made as to whether the monitoring device continuously receives the command messages. The process immediately returns to step 33 where a determination is made as to whether the monitoring device receives the requests of returning data command messages and then implements the above steps again.

Figure 4:
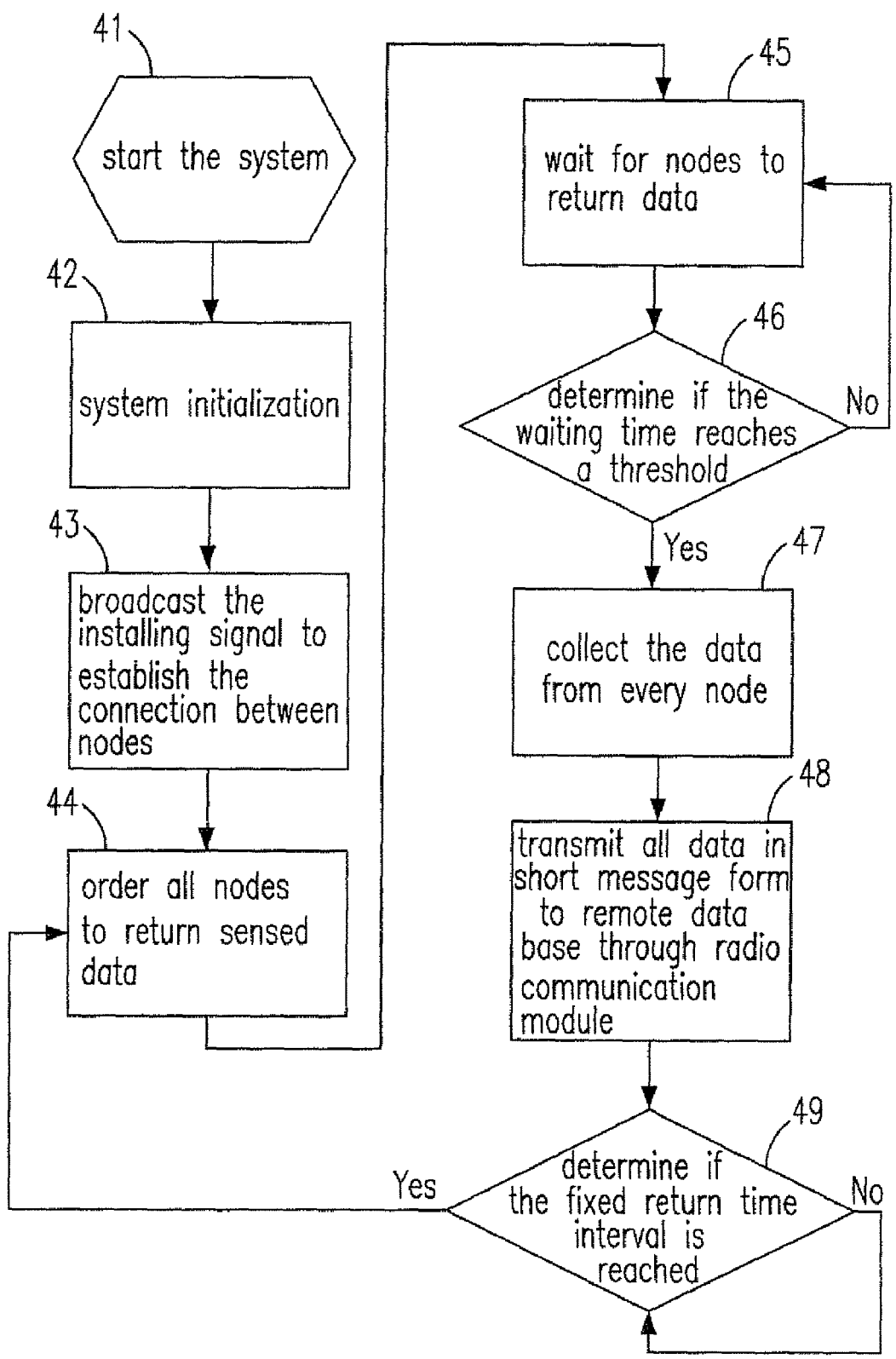
FIG. 4 is a flow chart showing an embodiment for an automated water quality monitoring apparatus according to the present invention.

Please refer to FIG. 4, which is a flow chart showing an automated water quality monitoring apparatus of an embodiment according to the present invention. First of all, the process begins at step 41 where the monitoring device is started. Then, the process proceeds to step 42 where the monitoring device initialization is implemented so that the monitoring device returns to an initial state. The process then proceeds to step 43 where a determination is made as to whether the connections between any two nodes are built via the broadcasting signal of the gateway, so that the monitoring device can be operated in a ready condition. The process then proceeds to step 44 where a command of requested data to all nodes is ordered. The process then proceeds to step 45 where the system waits for the returning data from each node. The process then proceeds to step 46 where a determination is made by the system as to whether the waiting time exceeds the set value. Once the waiting time exceeds the set value, the process then proceeds to step 47 where all the requested data are compiled by the system. The process then proceeds to step 48 where all the data in a message type are transmitted to the local data base via a wireless communication module. The process then proceeds to step 49 where a determination is made by the system as to whether the returning time reach the time interval. Once the returning time reaches the time interval, the process then returns to step 44 where the command of the requested data to all the nodes is ordered by the system and reruns again.

Therefore, the automated remote water quality monitoring devices, the monitoring systems and the monitoring methods provided in the present invention utilizes the radio communication module between the respective monitoring devices (nodes) to transmit the requested environmental data among the sensing networks for different level architectures. The wireless communication module utilizes a long-range communication module of the gateways to send SMS to the server via a base station for processing data.

This present invention can be used in remote areas without cell phone signals and overcome the geographical limitations, and achieve the results of real-time and automated environmental monitoring.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A water quality monitoring system, comprising:
a plurality of monitoring apparatuses, each of which has a radio communication module transmitting at least one environmental parameter;
a server receiving the at least one environmental parameter via a base station; and
a gateway being one selected from a group consisting of the plurality of monitoring apparatuses, being geographically the closest one to the base station, receiving the at least one environmental parameter and transmitting the at least one environmental parameter to the base station.

2. The water quality monitoring system of claim 1, further comprising:
a database connected to the server to store and deal with the at least one environmental parameter according to a format of the database.

3. The water quality monitoring system of claim 1, wherein each of the plurality of monitoring apparatuses further comprises:
at least one sensor measuring the at least one environmental parameter; and
a micro-controller receiving the at least one environmental parameter from the at least one sensor.

4. The water quality monitoring system of claim 3, wherein each of the plurality of monitoring apparatuses further comprises:
a GPS module for positioning;
the at least one sensor comprises a water quality sensor and a temperature and humidity sensor;
the at least one environmental parameter comprises a pH value, a conductivity, a salinity, a water quality, a temperature, a humidity and a combination thereof; and
the micro-controller further comprises a serial port switching circuit.

5. The water quality monitoring system of claim 1, wherein each of the plurality of monitoring apparatuses further comprises a wireless communication module transmitting a message to the server via the base station, wherein the message is derived from the at least one environmental parameter.

6. The water quality monitoring system of claim 5, wherein the wireless communication module is a GSM phone module.

7. The water quality monitoring system of claim 1, wherein each of the plurality of monitoring apparatuses further comprises:
a solar charging device providing a first power;
a power supply circuit connected to one of the solar charging device; and
an external power supply providing a second power.

8. The water quality monitoring system of claim 1, wherein the at least one environmental parameter is transmitted/received via a radio signal and each of the plurality of monitoring apparatuses has a best route to communicate with one another and further comprises a display screen providing an on-site monitoring.

9. A water monitoring method for a monitoring system having a node and a plurality of monitoring apparatuses, the method comprising the steps of:
(A) using at least one of the plurality of monitoring apparatuses to detect at least one environmental parameter, wherein the step (A) further comprises the steps of (A1) initializing the plurality of apparatuses, and (A2) sending a data request command to the at least one of the plurality of monitoring apparatuses for requesting the at least one environmental parameter;
(B) selecting a specific one being the closest one to the node from the plurality of monitoring apparatus to communicate with the node;
(C) transmitting the at least one environmental parameter to the specific one; and
(D) transmitting the at least one environmental parameter via the node.

10. The method of claim 9 further comprising a step of returning to step (A1) if a detection of the at least one environmental parameter is abnormal.

11. The method of claim 10 further comprising a step of broadcasting an installing signal to establish the communication between the specific one and the at least one of the plurality of monitoring apparatuses.

12. The method of claim 10, wherein the step (C) further comprises the steps of:
(C1) transmitting the at least one environmental parameter to the specific one via a micro-controller and a radio communication module of the at least one of the plurality of monitoring apparatuses; and
(C2) using the specific one to compile the at least one environmental parameter transmitted from the radio communication module.

13. The method of claim 10, wherein the node is a base station and the step (D) further comprises a step (D1) of transmitting the at least one environmental parameter to a server by a message generated from a wireless communication module of the specific one.

14. A monitoring system including a plurality of water quality monitoring apparatuses communicating with a node, comprising:
a first water quality monitoring apparatus configured to be the geographically closest one to the node for communicating with the node; and
at least one second water quality monitoring apparatus configured to communicate with the first water quality monitoring apparatus;
wherein each of the water quality monitoring apparatuses comprises:
at least one sensor measuring at least one environmental parameter,
a micro-controller receiving the at least one environmental parameter from the at least one sensor, and
a radio communication module configured to transmit the at least one environmental parameter of the micro-controller.

15. The system of claim 14, wherein each of the water quality monitoring apparatuses further comprises:
a GPS module positioning the at least one monitoring apparatus;
a wireless communication module transmitting a message transferred from the at least one environmental parameter via the node;
a solar charging device storing power for the apparatus;
a power supply circuit connected to one of the solar charging device and a power supply providing a second power; and
a display screen providing an on-site monitoring.

16. The system of claim 14, wherein the at least one sensor further comprises a water quality sensor and a temperature and humidity sensor, the wireless communication module is a GSM phone module and the node is a base station.

17. The system of claim 14, wherein the micro-controller further comprises a serial port switching circuit coupled to the at least one sensor and the radio communication module, and the micro-controller controls the at least one sensor and the radio communication module via the serial port switching circuit.

18. The system of claim 14, wherein the at least one environmental parameter is one selected from a group consisting of a pH value, a conductivity, a salinity, a water quality, a temperature, a humidity and a combination thereof.

* * * * *